Patented Jan. 28, 1930

1,745,267

UNITED STATES PATENT OFFICE

HARRY R. PENNINGTON, OF CHICAGO, ILLINOIS, ASSIGNOR TO HOLLUP CORPORATION, A CORPORATION OF ILLINOIS

COATING FOR WELDING RODS

No Drawing.    Application filed May 22, 1926.    Serial No. 111,039.

My invention relates to improvements in coatings for welding rods, and particularly for rods to be used in connection with the welding process known as electric arc welding.

My improvements are especially adapted for that form of electric arc welding known as the "metallic arc process". It is well known that approximately half of the carbon, as well as some of the other elements, such as manganese, contained in ordinary welding rods is lost when fused by the electric arc so that when rods containing carbon and manganese or certain other elements in quantities as great as are commercially obtainable in wire form are employed, the alloys in the deposited metal or weld are insufficient in quantity to give the desired results for many purposes. My invention is intended to overcome this inherent trouble and permit the formation of welds containing the desired elements in suitable proportions.

The principal object of my invention therefore is to provide a coating for welding rods or electrodes of such composition that when the coated rods are used, carbon or other elements, such as chromium, manganese, or the like, will be introduced into the deposited metal in suitable proportions.

To give satisfactory results, the coating of the welding wire or rods for metallic arc welding must not only combine properly with the elements in the weld deposit, but, in addition, the deposited metal must form a homogeneous mass with the base metal to which it is added. When powdered carbon alone is applied to the surface of a wire with a binder, the arc characteristic is altered in such a way that the rod melts in large globules which prevent uniform distribution of the carbon, and, in addition, does not fuse properly with the base metal, which results in a non-homogeneous deposit which, in service, does not give satisfactory results as a rule.

For making a satisfactory weld having the correct percentage of carbon, I use a coating consisting of free carbon mixed with powdered iron which is applied to the surface of the welding rod with a suitable binder, such as sodium silicate. This coating gives satisfactory results, both as to the hardness of the deposited metal and fusion with the base metal. Although graphite may be used, I prefer to employ other forms of commercial carbon. By the addition of the powdered iron to the coating containing the carbon a smooth arc results, and the electrode melts uniformly in minute globules and effects a proper penetration or depth of fusion in the base metal. Furthermore, due to the metal of the rod being expelled in a finely divided state, the penetration of the carbon or its gases into the fused metal is facilitated, which results in a greater and more uniform hardness of the weld.

As a specific example of my improvements, above outlined, I have used a mixture containing approximately 70% carbon and 30% powdered iron mixed with a suitable binder, such as sodium silicate, which coating was applied to the surface of a commercial welding rod. The deposited metal contained as much as 1.2% combined carbon. The rod used was a mild steel rod having a carbon content of only 0.1% to 0.2% combined carbon. The additional carbon in the weld was derived from the coating. In other cases, I have employed rods containing approximately 0.7% combined carbon, together with a comparatively thin coating of the mixture above described, the resulting weld contained approximately the same carbon as that in the rod. In this case only sufficient carbon was added to the deposited metal from the coating to compensate for that lost in the welding process, which, under ordinary conditions, is about 0.3%. It will be apparent therefore that the carbon may be supplied to the coating in various proportions and that the coating may be used in different quantities to produce any particular result desired. Without iron the metal does not flow properly but with the powdered iron mixed with the carbon the metal does flow properly, and the degree of improvement increases with an increased percentage of iron, about to the 30% proportion previously mentioned. Below 5% the improvement is negligible. It will be obvious that these are not hard and fast limits, but suggest the most effective range.

If it is desirable for the deposited metal to have a chromium, manganese or silicon content in addition to the carbon, the powdered ferrous alloys of said elements may be added to the coating in suitable proportions. These ingredients may be employed in different combinations and proportions for producing welds of different degrees of hardness and toughness, the character and size of the rod being considered, as will be understood. Thus, it is practical to make welds having a carbon content as great as 2%, manganese 2% and chromium 4% by varying the proportions of the coating ingredients and the thickness of the coating, the size of the welding rod being taken into consideration. For example, I have successfully employed a coating containing carbon where approximately 6% of the powdered iron was replaced with ferro-chromium in powdered form. The rod in this instance contained 0.6% carbon but no chromium. The coating was of such thickness that when the rod, together with the coating was melted by an arc, the weld contained approximately 0.7% carbon and 1% chromium. In some cases, where carbon and one of the ferrous alloys is present in the same coating, the iron of the alloy will act as a substitute for the whole or a portion of the powdered iron, which results in quieting the arc and permitting the proper amount of carbon to enter the deposited metal.

Where it is not desired to increase the carbon content of the deposited metal over the percentage, if any, that will be supplied by the carbon of the rod, the coating may consist of a suitable binder, together with ferro-chromium, ferro-manganese or ferro-silicon in suitable portions, or only one or two of the said alloys may be used, depending on the qualities desired in the weld.

Although I have described my improvements as being used with electric arc welding apparatus, it will be understood that I contemplate the use of my coatings on rods used with the oxyacetylene apparatus as well.

What I claim as new is:

1. A coating for a welding rod comprising powdered carbon and powdered iron in the proportion of 5 to 30 percent of iron as compared to the two ingredients combined, and a binder.

2. The method of introducing extraneous carbon into a weld made by the metallic arc process, employing a welding rod and which consists in first coating said rod with powdered carbon and powdered iron in the ratio of 30 percent or less of iron to 70 percent or more of carbon, and thereafter melting said rod in the usual manner.

In testimony whereof, I have subscribed my name.

HARRY R. PENNINGTON.